W. H. CADWELL.
ELEVATING TRUCK.
APPLICATION FILED SEPT. 26, 1908.
924,143.
Patented June 8, 1909.
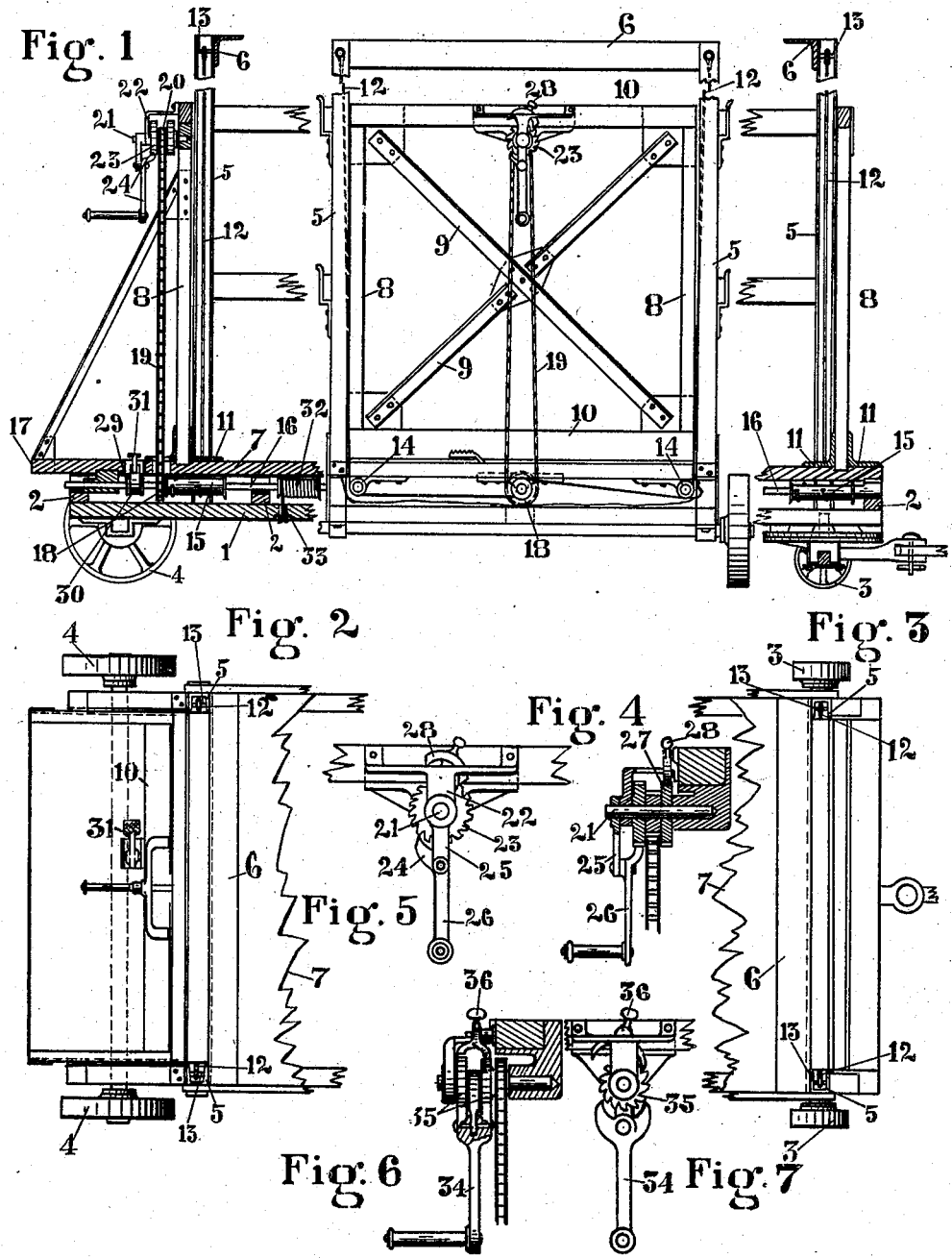
WITNESSES:
INVENTOR
WILLIAM H. CADWELL.
BY
ATTORNEYS

UNITED STATES PATENT OFFICE.

WILLIAM H. CADWELL, OF WILLIAMSTON, MICHIGAN.

ELEVATING-TRUCK.

No. 924,143.　　　　　Specification of Letters Patent.　　　　Patented June 8, 1909.

Application filed September 26, 1908. Serial No. 454,919.

*To all whom it may concern:*

Be it known that I, WILLIAM H. CADWELL, a citizen of the United States of America, residing at Williamston, in the county of Ingham and State of Michigan, have invented certain new and useful Improvements in Elevating Trucks, of which the following is a specification, reference being had therein to the accompanying drawings.

This invention relates to an icing wagon for cars, and more especially to means therein for raising or lowering the body thereof for transferring a load from one level to another.

The invention consists in the matters hereinafter set forth and more particularly pointed out in the appended claims.

In the drawings, Figure 1 is a view in section of a wagon embodying features of the invention, the middle portion being broken away, together with an end elevation shown. Fig. 2 is a plan view of one end portion. Fig. 3 is a plan view of the other end portion. Fig. 4 is a view in section of the member. Fig. 5 is a view in detail of an operating member. Figs. 6 and 7 are views in detail of a modified form of lifting lever.

As herein illustrated, a main frame having longitudinal sills 1, and cross sills 2, is supported on forward bearing wheels 3 and rear bearing wheels 4, and is provided near each end with a pair of parallel guide posts 5, preferably channel irons, with the flanges inturned, a cross angle bar 6 connecting the upper ends. A platform 7 is vertically movable between the guides, its proper position parallel to the main frame being maintained by a pair of end frames bearing against the outside of each pair of guides. The frames are each preferably constructed with upright side members 8, diagonals 9, cross members 10 and angle plates 11, or in any other way to insure strength and lightness. The platform is suspended at each end by a pair of cables 12 or like flexible connections, each secured at one extremity to the upper end of the adjacent posts 5, preferably by pins 13 through the channel flanges so that the cable lies wholly within the post. Each cable passes around a sheave or pulley block 14 on the frame sill, and is attached to a drum 15 secured on a centrally disposed shaft 16 journaled on the underside of the platform, one end 17 of which extends beyond the adjacent end frame as an operator's stand. A sprocket wheel 18 is secured on the shaft and is connected by an endless sprocket chain 19 to a drive sprocket 20 keyed or otherwise secured on a short shaft 21 journaled in bearings on a suitable bracket 22 on the upper cross bar 10 of a platform end frame above the operator's stand. A ratchet wheel 23 keyed or otherwise made fast on the shaft 21, may be engaged and turned by the pawl 24 of a handle lever 26 oscillatory on the shaft, the lever preferably having an inner arm 25 swinging from the shaft 21 and an outer arm 26 pivoted thereto with the pawl 24 disposed to hang clear of the wheel until the outer arm is moved forward when the pawl catches the wheel, the lever then turning as a whole on the shaft during the forward movement of the lever handle. A detent wheel 27 secured on the ratchet shaft is engaged by a safety dog 28 adjustable to lock the wheel against turning in either direction.

A brake drum 29 is secured on the shaft 16 and band brake 30 thereon is controlled by a foot lever 31, projecting through the operator's stand.

By this means an operator can readily elevate a load to the required height for icing a car or the like and carries himself with it so that he can quickly unload. Owing to the arrangement of the operating ratchet, the handle cannot catch and be thrown around when the platform is lowered, thereby obviating all chances of injury to the user.

If it is desired to have means for positively lowering the platform, and not depending on gravity alone, as the platform may not descend readily if the wagon is standing at an angle, a lowering drum 32 is placed on the main shaft and a cable 33 attached thereto and to the main frame, so as to be unrolled as the platform rises. A double pawl lever 34 (Figs. 6 and 7) is adapted when properly oscillated to act on either of opposite ratchet wheels 35 to turn the shaft and sprocket connections, and thereby positively lower the platform while a double dog 36 acts as a safety latch.

Obviously, changes in the details of construction may be made without departing from the spirit of the invention and I do not care to limit myself to any particular form or arrangement of parts.

What I claim as my invention is:—

1. An icing wagon comprising a wheeled frame having upright guide posts, a platform reciprocable between the guides, a drum shaft journaled on the underside of the platform extending longitudinally thereof, drums on the shaft each in substantially the plane of the adjacent guide, guide pulleys on the platform, a cable attached to the upper end of each post, passed around a pulley and secured to the adjacent drum, a ratchet shaft on the platform, chain and sprocket driving connections between the shafts, a ratchet lever oscillatable on the ratchet shaft, adapted to operatively engage the ratchet wheel, a pedal brake on the platform for the shaft, a detent wheel secured on the short shaft, and a safety dog for the detent wheel.

2. An icing wagon comprising a wheeled frame having upright guide posts, a platform reciprocable between the guides a drum shaft journaled on the underside of the platform extending longitudinally thereof, drums on the shaft each in substantially the plane of the adjacent guides, guide pulleys on the platform, a cable attached to the upper end of each post, passed around a pulley and secured to the adjacent drum, a ratchet shaft on the platform, chain and sprocket driving connections between the shafts, a ratchet wheel secured on the ratchet shaft, a ratchet lever having an inner arm swinging from the ratchet shaft, an outer arm pivoted at its inner end to the outer end of the inner arm, a pawl on the outer arm adapted to engage the ratchet wheel when the outer arm is moved in one direction, and to clear the wheel when the lever is not operated, a friction brake on the shaft, a detent wheel on the shaft and a safety dog engaging the detent.

3. An icing wagon comprising a frame having longitudinal and cross-sills, bearing wheels supporting the frame, a pair of parallel upright channel iron guide posts near each end of the frame disposed with the flanges turned inward, a platform over the frame reciprocable between the guides, a frame on each end of the platform, each having sliding engagement with the outer faces of the adjacent pair of guide posts, a drum shaft journaled on the underside of the platform, drums on the shaft each in substantially the plane of the guides, guide pulleys on the underside of the platform, a cable moving on each pulley secured at one end to the adjacent shaft drum and at the other to the upper end of an adjacent guide post between the flanges thereof, a ratchet wheel shaft rotatably secured on a platform end frame parallel to the drum shaft, chain and sprocket driving connections between the shafts, a ratchet wheel secured on the ratchet shaft, a ratchet lever oscillatable on the ratchet shaft, adapted to operatively engage the ratchet wheel, a pedal brake on the platform for the short shaft, a detent wheel secured on the shaft, and a safety dog for the detent wheel.

4. An icing wagon comprising a frame having longitudinal and cross sills, bearing wheels supporting the frame, a pair of parallel upright channel iron guide posts near each end of the frame disposed with the flanges turned inward, a platform over the frame reciprocable between the guides, a frame on each end of the platform, each having sliding engagement with the outer faces of the adjacent pair of guide posts, a drum shaft journaled on the underside of the platform, drums on the shaft each in substantially the plane of the guides, guide pulleys on the underside of the platform, a cable running on each pulley secured at one end to the adjacent shaft drum and at the other to the upper end of an adjacent guide post between the flanges thereof, a ratchet wheel shaft rotatably secured on a platform end frame parallel to the drum shaft, chain and sprocket driving connections between the shafts, a ratchet wheel secured on the ratchet shaft, a ratchet lever having an inner arm swinging from the ratchet shaft, an outer arm pivoted at its inner end to the outer end of the inner arm, a pawl on the outer arm adapted to engage the ratchet wheel when the outer arm is moved in one direction, and to clear the wheel when the lever is not operated, a friction brake on the shaft, a detent wheel on the shaft and a safety dog engaging the detent.

In testimony whereof I affix my signature in presence of two witnesses.

WILLIAM H. CADWELL.

Witnesses:
C. R. STICKNEY,
OTTO F. BARTHEL.